W. C. Cook
Running Gear for Vehicles
No. 74802 — Patented Feb 25, 1868
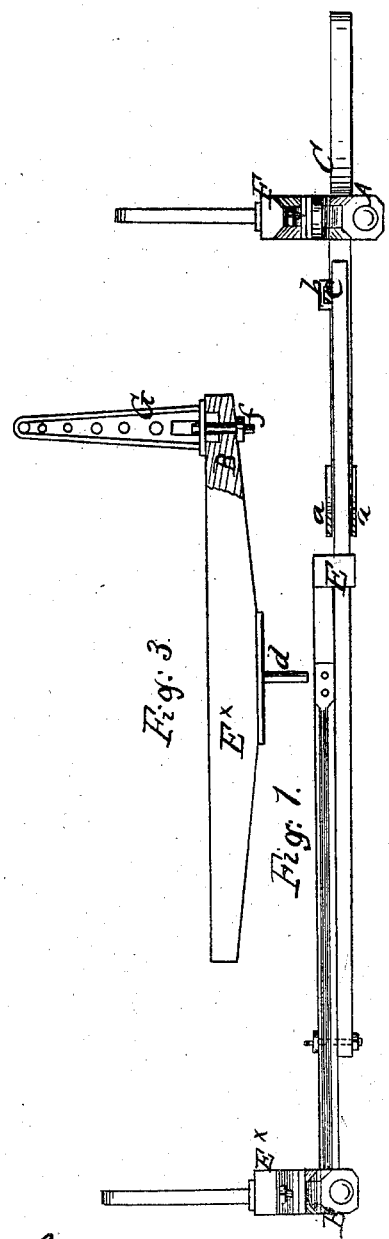
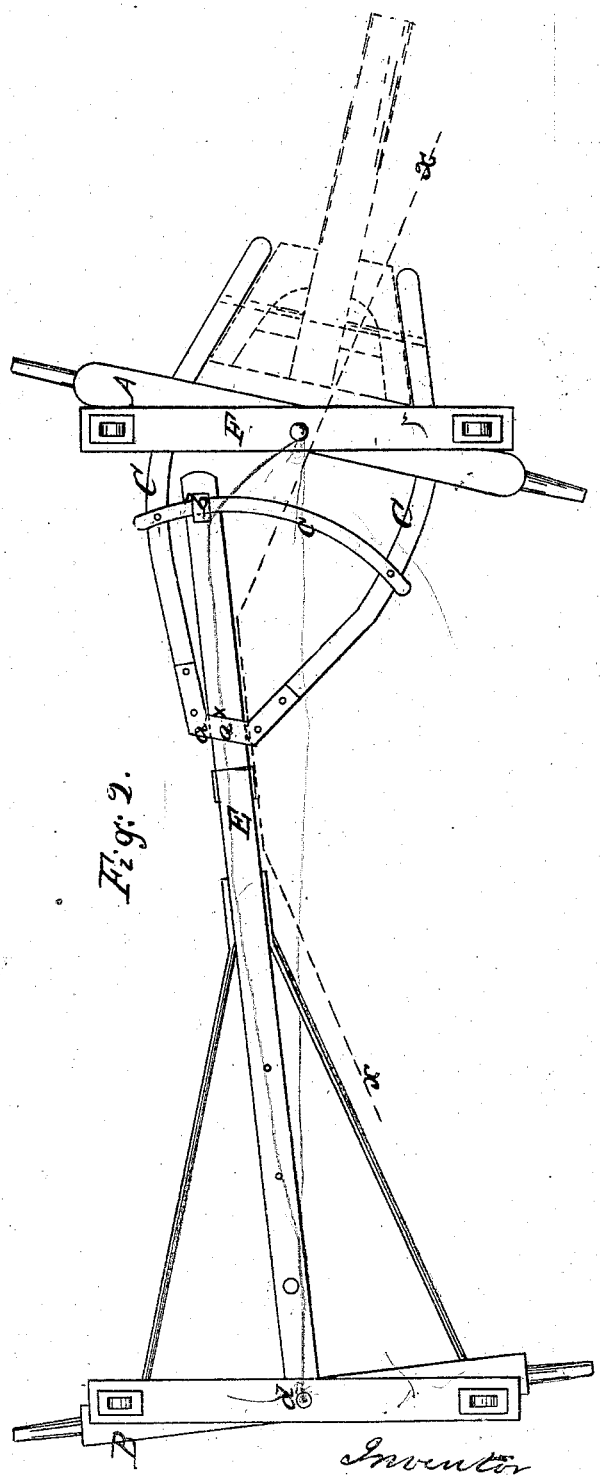
Witnesses:
W. C. Ashketter
Thos Tushe
Inventor:
W. C. Cook
per Munn & Co.
Attys

United States Patent Office.

W. C. COOK, OF APPLETON, WISCONSIN.

Letters Patent No. 74,802, dated February 25, 1868.

---

IMPROVEMENT IN RUNNING-GEAR FOR WHEELED VEHICLES.

---

The Schedule referred to in these Letters Patent and making part of the same.

---

TO ALL WHOM IT MAY CONCERN:

Be it known that I, W. C. COOK, of Appleton, in the county of Outagamie, and State of Wisconsin, have invented a new and improved Running-Gear for Wheeled Vehicles; and I do hereby declare that the following is a full, clear, and exact description thereof, which will enable those skilled in the art to make and use the same, reference being had to the accompanying drawings, forming part of this specification.

This invention consists in a novel construction and arrangement of gearing for wheeled vehicles, whereby a vehicle may be turned within a much smaller compass than usual. In the accompanying sheet of drawings—

Figure 1 is a side sectional view of my invention, taken in the line $x\ x$, fig. 2.

Figure 2, a plan or top view of the same.

Similar letters of reference indicate corresponding parts.

A represents the front, and B the rear axle of a wheeled vehicle, and C C represent hounds, which are secured in the front axle A, said hounds extending back in curved form, so as to gradually approach each other, and connected at their rear ends by metal plates, $a\ a$, which are secured to their upper and lower surfaces, said plates forming a bearing for the front part of the reach E, which passes between them, and extends nearly to the front axle. The front part of the reach has a staple, $b$, attached to it, which is fitted and works on a segment-bar, $c$, the ends of which are firmly secured to the hounds. This bar $c$ serves as a guide for the front end of the reach, and at the same time forms a connection between the front and rear axles. The rear bolster $E^\times$ is attached to the rear axle B, by means of a central bolt, $d$, in the same way as the front bolster F is attached to the front axle A of wheeled vehicles, and by this arrangement it will be seen that in cramping or turning the vehicle, both axles are allowed to turn, and as the front axle, A, turns from a centre considerably at its rear, the centre, being the centre $a^\times$ of a circle, of which the segment-bar $c$ is a portion, the vehicle may be turned within a much smaller compass than usual. This will be fully understood by referring to fig. 2. I design to have the stakes G constructed of malleable cast iron, and secured to the bolsters by a single bolt, $f$, as shown clearly in fig. 3. By this means strong stakes are obtained, and they are firmly attached to the bolsters without diminishing the strength of the same, as is the case with the wooden stakes framed into the bolsters, the mortises in the latter to receive the tenons of the stakes, rendering the ends of the bolsters very weak, so that they are liable to split.

I claim as new, and desire to secure by Letters Patent—

1. The combination of the reach E with the hounds C C of the front axle A, the bearing-plates $a\ a$, at the rear of the hounds, the pivoted rear axle B, and the segment-bar $c$, with the front end of the reach connected to it by a staple, $b$, all arranged substantially in the manner as and for the purpose set forth.

2. The construction of metal stakes G, secured to the bolsters, each by a single bolt, $f$, arranged and applied substantially as shown and described.

W. C. COOK.

Witnesses:
JAMES RYAN,
M. H. LYON.